United States Patent
Gilbert et al.

(12)

(10) Patent No.: US 6,423,783 B1
(45) Date of Patent: Jul. 23, 2002

(54) MODIFIED RUBBER POLYMER LATEX

(75) Inventors: Robert Goulston Gilbert, Newtown (AU); Nadaraja Subramaniam, Ludwigshafen (DE); Michael John Monteiro, Eindhoven (NL); Robert Balic, Red Cliffs (AU)

(73) Assignee: University of Sydney, Sydney (AU)

( * ) Notice: Subject to any disclaimer, the term of this patent is extended or adjusted under 35 U.S.C. 154(b) by 0 days.

(21) Appl. No.: 09/381,535

(22) PCT Filed: Mar. 23, 1998

(86) PCT No.: PCT/AU98/00191

§ 371 (c)(1),
(2), (4) Date: Nov. 4, 1999

(87) PCT Pub. No.: WO98/42761

PCT Pub. Date: Oct. 1, 1998

(30) Foreign Application Priority Data

Mar. 21, 1997 (AU) .............................. PO 5811

(51) Int. Cl.$^7$ .................................................. C08F 2/16
(52) U.S. Cl. ..................... 525/302; 525/309; 525/310; 524/458
(58) Field of Search ................................ 525/302, 309, 525/310; 524/458

(56) References Cited

U.S. PATENT DOCUMENTS 5,231,142 A     7/1993   Tsubokura et al.
5,252,657 A  * 10/1993   Frankel et al. .............. 525/301

FOREIGN PATENT DOCUMENTS

| DE | 1583 25       | 1/1983  |
| EP | 0 146 035 A2  | 6/1985  |
| EP | 0 326 383     | 8/1989  |
| EP | 0 368 244 A2  | 5/1990  |
| GB | 2 068 392 A   | 8/1981  |
| JP | WO96/32440    | 10/1996 |
| WO | WO96/15168    | 5/1996  |

OTHER PUBLICATIONS

Derwent Abstract No. 85–206714/34 (1985).
Derwent Abstract No. 85–206715/34 (1985).
Derwent Abstract No. 85–293928/47 (1985).
Derwent Abstract No. 86–004873/01 (1985).
Derwent Abstract No. 96–477095/47 (1996).
Derwent Abstract No. 90–080336/11 (1990).
Derwent Abstract No. 81–74535 (1981).
Derwent Abstract No. 89–238912/33 (1989).
Derwent Abstract No. 75–32441W/20 (1975).
Derwent Abstract No. 90–272925/36 (1989).
Derwent Abstract No. 96–240205/25 (1996).
Derwent Abstract No. 96–32440 (1996).
Derwent Abstract No. 92–155464 (1992)*.

* cited by examiner

*Primary Examiner*—James J. Seidleck
*Assistant Examiner*—Olga Asinovsky
(74) *Attorney, Agent, or Firm*—Nixon & Vanderhye

(57) ABSTRACT

Process for forming a modified polymer having unsaturated carbon/carbon bonds including taking or making a colloidal dispersion of the polymer in an aqueous medium, swelling the polymer in the colloidal particles with at least one polymerizable monomer having a solubility in water of less than $10^{-3}$ molar, and inducing a free-radical polymerization of the monomer(s) within the swollen colloidal particles of the polymer such that the monomer enters into a grafting reaction with the polymer. The process is particularly appropriate for preparation of modified natural rubber latex.

11 Claims, No Drawings

MODIFIED RUBBER POLYMER LATEX

TECHNICAL FIELD

The present invention relates to modified polymers of the type including carbon/carbon double bonds. More particularly the invention relates to such polymers when modified by the polymerisation of at least one monomer of low water solubility within a pre-existing polymer latex to yield materials containing interlinked polymers.

BACKGROUND ART

Modification of rubbery polymer colloids containing double bonds is common, including for example post-polymerisation processing of styrene-butadiene rubber and of neoprene. Another example comprises modification of natural rubber latex. One of the major components in natural rubber latex is cis-1,4polyisoprene, of which certain properties are unmatched by most synthetic rubbers. In addition, the unsaturated backbone in natural rubber allows various types of chemical modification to be performed, to yield a wide range of rubber products found in today's market. Prior chemical modifications of the isolated polymer include hydrogenation, epoxidation, chlorination, grafting, vulcanising and other polymerisation processes. Modification of a rubber latex (ie., without prior isolation of the polymer) is more challenging. Typical of earlier studies are those carried out using natural rubber latex swollen with methyl methacrylate (MMA) and then polymerised. The resulting polymer consists in part of PMMA grafted onto natural rubber, commercially known as Hevea Plus, a product which has now been discontinued due to low levels of grafting and cracking on casting. Many attempts have been made by other investigators to graft oil-soluble vinyl monomers onto natural rubber latex using various types of initiators. However, the problems associated with their attempts range from secondary particle formation, types of grafting (ie. comb or T-shape) to non-uniform modification of all rubber chains. All current products are spatially non-uniform: eg., electron microscopy shows that the particles have spatially separate regions comprising pre-existing polyisoprene and new polymer.

DISCLOSURE OF INVENTION

The aim of this work is to modify rubber latices including those of natural rubber to produce novel materials in order to overcome some of the problems stated above. Experiments based on a mechanistic understanding of emulsion polymerisation were designed, which resulted in the use of monomers of very low water solubility, such as vinyl neo-decanoate. The inventors characterise the morphology and properties of the resulting materials as containing interlinked polymers. The term "interlinked" in this context is taken to mean physical and/or chemical linking between polymers.

The present invention consists in a process for the formation of a modified polymer of the type having unsaturated carbon/carbon bonds, the process including the steps of:
a) taking or making a colloidal dispersion of the polymer in an aqueous medium,
b) swelling the polymer in the colloidal particles with at least one polymerisable monomer having a solubility in the aqueous medium of less than $10^{-3}$ molar, and
c) inducing a free radical polymerisation of the monomer(s) within the swollen colloidal particles of the polymer.

In another aspect the present invention consists of a material in the form of interlinked polymers produced by the method according to the present invention. In a still further aspect the present invention consists of a polymer of the type having unsaturated carbon/carbon bonds, wherein after polymerisinig an added monomer or monomers there is interlinked with the original polymer a new polymer or polymers formed in-situ within the original polymer from the added monomers.

The present invention is particularly applicable to the preparation of modified natural rubber latex. In this embodiment of the invention the natural rubber latex, which is already in the form of a colloidal suspension of polymer particles in water, is swollen with the monomer(s) and then polymerised. The present invention may with proper selection of reagents, however, be used to prepare modified polymers based on any polymer including unsaturated carbon/carbon bonds which may be formed into or exist as a colloidal suspension. Among the synthetic elastomers to which the present invention may be applied are isoprene rubbers, chloroprene rubbers including neoprene rubbers, polybutadiene rubbers, nitrile-butadiene rubbers, styrene-butadiene rubbers, polypentenamers, and ethylene-propylene-diene terpolymers. The unsaturated carbon/carbon bonds are usually double bonds in or pendant from an aliphatic chain but are not necessarily so.

The monomers for use in the present invention are characterised by their low solubility in aqueous media. They should have a solubility in water of less than $10^{-3}$ M and preferably between $10^{-4}$ M and $10^{-9}$ M, more preferably between $10^{-5}$ M and $10^{-7}$ M. To be useful in carrying out the present invention they must be capable of swelling the polymer and also be capable of free-radical initiated polymerisation. The most preferred monomer for use in carrying out the present invention is vinyl neo-decanoate. Other monomers that are preferred are straight chain or branched chain alkyl or aryl vinyl esters having at least 6 carbon atoms, alkyl acrylates, alkyl methacrylates, vinyl acrylates and vinyl methacrylates. More preferred are vinyl 2-ethylhexanoate, vinyl 4-tert butyl benzoate, n-dodecyl acrylate, n-dodecyl methacrylate, 2-ethylhexyl acrylate, p-methyl styrene, vinyl toluene and 4-tert butyl styrene. The monomers are preferably formed into an emulsion with a suitable surfactant and added to the dispersion of the polymer or they are added to the dispersion and agitated. It is normal to allow the monomer(s) to sit in contact with the polymer for a period of from minutes to some hours in order for the monomer(s) to penetrate the polymer and swell it. The monomer(s) should for preference not be added in a greater amount than can be adsorbed by the polymer. Provided one or more of the low-solubility monomers described above are present, other monomers of any solubility may also be added to the reaction mixture and included in the polymers according to the present invention.

The term swelling in this context is taken to mean the entry of monomer(s) into the polymer particle and diffusion through the particle. There will usually be a concomitant physical increase in the size of the polymer particles.

Without limitation to the scope of the present invention the following explanation of the mechanism of the present invention is proposed. The process seeks to avoid the formation of secondary particles during the polymerisation process. It is thought that secondary nucleation results in the formation of new particles outside the polymer particles, and the subsequent imbibing of these new particles into pre-existing polymer particles is responsible for some or all of the spatial homogeneities observed in current products. The avoidance of secondary particle formation, including particles which may be later imbibed into pre-existing polymer particles, was carried out by choosing monomers of very low water solubility. This is because radicals formed from initiator are most likely to react with an individual monomer molecule, perhaps in the water phase to form a species that is subsequently free to polymerise anywhere in the particle. It is believed that if the polymer were present in the aqueous phase in a greater concentration there would be a reaction between the activated monomer molecule and one or more other monomer molecules resulting in secondary particle formation. The products of the present invention show a number of distinct glass transition temperatures. These temperatures often are very close to but not identical to the values that would be expected from the pure polymers. The fact that the glass transition temperatures have moved slightly suggests that in addition to the polymerisation reaction the activated monomer species may also enter into some grafting reactions with the polymer. During polymerisation some grafting to the carbon-carbon double bonds and/or transfer reactions in the pre-existing polymers may occur, which because it will commence early in the polymerisation will interlink newly formed polymer into the pre-existing polymer.

MODES FOR CARRYING OUT THE INVENTION

Natural rubber latex was diluted with water and surfactant, such as Aerosol MA 80 or potassium oleate, to give the required solids content. Monomer in a ratio of 1:2 by mass of polymer to monomer (unless otherwise stated) was then added and allowed to swell into the natural rubber particle before commencement of polymerisation with a water-soluble initiator.

Analysis of the resulting materials to determine glass transition temperatures was carried out on a Modulated Differential Scanning Calorimetry (MDSC), using sample sizes of approximately 15 mg with a ramp rate of 3° C./min from −120° C. to 120° C., or by dynamic mechanical thermal analysis (DMTA), using samples made from a film, for example by casting a film on a glass plate, scanning for example from −90° C. to room temperature with an applied frequency of 1 Hz. Particle morphology was characterised by Transmission Electron Microscopy (TEM) using two techniques: cryo-sectioning and also microtominig the sample (set in a resin) with $OsO_4$ staining.

Results and Discussion

EXAMPLE 1

(Vinyl Neo-decanoate+NRL)

The polymerisation of vinyl neo-decanoate into the natural rubber latex was performed at 50° C. It was found that the polymerisation did not exceed above 30% conversion after a day. Kinetic analysis confirmed that the mechanism for this retardation was due to vinyl neo-decanoate chain end radicals preferentially abstracting hydrogens from the backbone of polyisoprene to form stable allylic radicals. These incipient radicals are slow to react with vinyl neo-decanoate monomer, which slows the rate of polymerisation drastically, and therefore act as radical terminators for polymeric radicals. This results in an increase in chain branching to the polyisoprene backbone.

Analysis of the resulting material by MDSC gave two distinct glass transition temperatures (Tg's): the first at −61° C. and the second at −7° C. The first Tg of −62° C. corresponds closely to that of pure natural rubber (Tg=−67° C.), whereas the second corresponds to that of poly vinyl neo-decanoate (Tg=−7° C.). Particle morphology appears to be relatively homogeneous as observed from transmission electron microscope (TEM) on the cryo-sectioned sample, and in addition showed no secondary particle formation. This suggests that the material contains interlinked polymers. This is in contrast to products formed by conventional second-stage polymerisation of natural rubber latex where the second-stage polymer is seen to be not uniformly distributed or blended throughout the pre-existing particle.

EXAMPLE 2

(Vinyl Toluene+NRL)

The polymerisation of vinyl toluene into the natural rubber latex was performed at 50° C. and reached high conversions. MDSC analysis gave two distinct glass transition temperatures, the first at −63° C. and the second at 91° C. The first transition corresponds closely to that of pure natural rubber, whereas the second corresponds to that of poly vinyl toluene (Tg=93° C.). Once again, there was no secondary particle formation. as observed from TEM.

EXAMPLE 3

(n-Dodecyl Acrylate+NRL)

The polymerisation of n-dodecyl acrylate into natural rubber latex was performed at 50° C. and reached very high conversions. MDSC analysis on one sample so prepared gave two distinct glass transition temperatures, the first at −66° C. and the second at −4° C. The first transition corresponds closely to that of pure natural rubber, whereas the second corresponds to that of poly n-dodecyl acrylate (Tg=−4° C.). DMTA analysis on the unpolymerised NRL shows a peak at −50° C.; a sample polymerised as above, when scanned by DMTA between −90 and 10° C., shows a peak at −43° C., i.e., the rubber peak is shifted which indicates grafting and/or other form of interlinking. Once again, particle morphology appears to be relatively homogeneous, with no secondary particle formation, as observed from TEM on the cryo-sectioned and microtomed sample.

EXAMPLE 4

(n-Dodecyl Acrylate+Vinyl Neo-decanoate+NRL)

The polymerisation of n-dodecyl acrylate and vinyl neo-decanoate into natural rubber latex was performed at 30° C., and reached very high conversions. At a mass ratio of 1:0.99:0.052 for NRL: n-dodecyl acrylate:vinlyl neo-decanoate, MDSC analysis gave several glass transition temperatures, the first a clear peak at −66° C., the second a weak peak at −14.4° C., and the third a weak peak at −4° C. The first transition corresponds closely to that of pure natural rubber, whereas the third corresponds to that of poly n-dodecyl acrylate (Tg=−4° C.). The second glass transition probably indicates grafting of poly n-dodecyl acrylate onto natural rubber, perhaps (but not necessarily) where the allylic radicals (see Example 1) can either add to n-dodecyl acrylate or terminate polymeric radicals. When the amount of vinyl neo-decanoate was increased to a mass ratio of 1:0.45:0.1 for NRL:n-dodecyl acrylate:vinyl neo-decanoate, MDSC analysis gave the following glass transition temperatures below −10° C.: the first at −66° C. corresponding to natural rubber, the second at −26.4° C., the third at −19.29. The second and third glass transitions indicate grafting of poly n-dodecyl acrylate onto natural rubber via the vinyl neo-decanoate grafting agent. Particle morphology appears to be relatively homogeneous as observed from TEM on the cryo-sectioned and microtomed samples, with no secondary particle formation, as observed by TEM.

EXAMPLE 5
(n-Dodecyl Methacrylate+NRL)

The polymerisation of n-dodecyl methacrylate into natural rubber latex was performed at 50° C., and reached high conversions. MDSC analysis gave two distinct glass transition temperatures, the first at −66° C. and the second a broad one with a maximum at −53° C. The first transition corresponds closely to that of pure natural rubber, whereas the second corresponds to that of poly n-dodecyl methacrylate (Tg=−55° C.). Particle morphology appears to have subinclusiolns concentrated at the edge of the natural rubber particle, as observed from TEM on the cryo-sectioned and microtomed samples, with no secondary particle formation, as observed by TEM.

EXAMPLE 6
(n-Dodecyl methacrylate+Vinyl neo-decanoate+NRL)

The polymerisation of n-dodecyl methacrylate and vinyl neo-decanoate into natural rubber latex was performed at 50° C., and reached high conversions. TEM analysis showed that the amount of subinclusions in the particle (as in Case 5) decreased substantially, becoming more homogeneous in nature. This result suggests that vinyl neo-decanoate not only acts as a grafting agent to the polyisoprene backbone in natural rubber but produces grafting sites spread homogeneously throughout the natural rubber particle, which in turn increases the homogeneous nature of n-dodecyl methacrylate in natural rubber.

SUMMARY

When vinyl neo-decanoate, n-dodecyl acrylate and n-dodecyl methacrylate (which each has a solubility in water of less than $0^{-4}$ molar) are used in various combinations, spatially homogenous particles are observed from TEM micrographs. The glass transition temperatures correspond closely to those of the homopolymers of the monomer and to natural rubber; some shifts however may be observed. Additional Tg's indicate some grafting. These data suggest that some interlinkinig has occurred, quite different from the very inhomogeneous and non-uniform product formed by conventional second-stage polymerisation of natural rubber latex.

INDUSTRIAL APPLICATION

The novel homogeneously-modified rubber latex could be used in applications such as pressure sensitive adhesives, gloves, aircraft tires and other rubber products. The invention is a unique method of producing a partially or fully homogeneous modified rubber latex without the disadvantages of the second-stage polymer being spatially inhomogeneous, which may otherwise have adverse properties in many of the above uses.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A process for the formation of a modified polymer of the type having unsaturated carbon/carbon bonds, the process comprising the steps of:
   (a) taking or making a colloidal dispersion of the polymer in an aqueous medium;
   (b) swelling the polymer in the colloidal particles with vinyl neo-decanoate; and
   (c) inducing a free radical polymerization of said vinyl neo-decanoate within the swollen colloidal particles of the polymer such that said vinyl neo-decanoate enters into a grafting reaction with the polymer.

2. The process as claimed in claim 1 in which the polymer is selected from the group consisting of natural rubber latex, isoprene rubbers, chloroprene rubbers, polybutadiene rubbers, nitrile butadiene rubbers, styrene-butadiene rubbers, polypentenamers, and ethylene-propylene-diene terpolymers.

3. The process according to claim 2 wherein said polymer is a neoprene rubber.

4. A process according to claim 2 in which the polymer is natural rubber latex.

5. A process according to claim 1 in which said monomer has a solubility in water of less than $10^{-3}$ M.

6. A process according to claim 5 wherein the solubility in water of said monomer is between $10^{-4}$ M and $10^{-3}$ M.

7. A process according to claim 6 wherein the solubility of said monomer in water is between $10^{-4}$ M and $10^{-7}$ M.

8. The process according to claim 1 in which other monomers of any solubility are also employed to swell the polymer.

9. A process as claimed in claim 8 in which the at least one monomer is selected from the group consisting of n-dodecylacrylate and n-dodecylmethacrylate.

10. A modified polymer produced by the process of claim 1.

11. A material in the form of interlinked polymers produced by the process as claimed in claim 1.

* * * * *